United States Patent
Lu

(10) Patent No.: US 12,111,967 B2
(45) Date of Patent: Oct. 8, 2024

(54) INPUT DEVICE

(71) Applicant: DEXIN CORP., New Taipei (TW)

(72) Inventor: Ho Lung Lu, New Taipei (TW)

(73) Assignee: DEXIN CORP., New Taipei (TW)

(*) Notice: Subject to any disclaimer, the term of this patent is extended or adjusted under 35 U.S.C. 154(b) by 162 days.

(21) Appl. No.: 17/954,219

(22) Filed: Sep. 27, 2022

(65) Prior Publication Data

US 2023/0214021 A1    Jul. 6, 2023

(30) Foreign Application Priority Data

Dec. 30, 2021 (TW) .................................. 110149696

(51) Int. Cl.
*G06F 3/01* (2006.01)
*G06F 3/0354* (2013.01)

(52) U.S. Cl.
CPC .......... *G06F 3/016* (2013.01); *G06F 3/03543* (2013.01)

(58) Field of Classification Search
None
See application file for complete search history.

(56) References Cited

U.S. PATENT DOCUMENTS

2017/0315616 A1* 11/2017 Kim .................... G06F 3/016
2019/0079584 A1* 3/2019 Bonanno ............. G06F 3/03543

* cited by examiner

*Primary Examiner* — Toan H Vu
(74) *Attorney, Agent, or Firm* — Maschoff Brennan

(57) ABSTRACT

An input device includes a casing, a first pressable portion, a second pressable portion, and at least one haptic generator, the casing includes a palm-supporting portion and at least one sidewall connected to each other, the first pressable portion and the second pressable portion are located adjacent to the palm-supporting portion of the casing, the first pressable portion, the second pressable portion, and the at least one sidewall are respectively located at different sides of the palm-supporting portion, the at least one haptic generator corresponds to the at least one sidewall and is configured to vibrate the at least one sidewall.

7 Claims, 3 Drawing Sheets

INPUT DEVICE

CROSS-REFERENCE TO RELATED APPLICATIONS

This non-provisional application claims priority under 35 U.S.C. § 119(a) on Patent Application No(s). 110149696 filed in R.O.C. (Taiwan) on Dec. 30, 2021, the entire contents of which are hereby incorporated by reference.

TECHNICAL FIELD

The disclosure relates to an input device, more particularly to an input device having at least one haptic generator.

BACKGROUND

A mouse is an input device configured to control the movement of the cursor on the computer screen. It allows user to move and select folders, text, files, and icons on a computer.

To majority of people, index finger and middle finger are respectively rest on the left and right buttons when holding a mouse, such that user can achieve the specific function by lightly pressing and releasing the selected button. The conventional mouse are configured to transfer input signal in response to its movement and the clicking by the user but do not provide any physical feedback in response to the operation of how the user uses the mouse.

SUMMARY

Accordingly, one aspect of the disclosure is to provide an input device capable of generating vibration in response to the operation by user and thereby enhancing the overall user experience.

One embodiment of the disclosure provides an input device includes a casing, a first pressable portion, a second pressable portion, and at least one haptic generator, the casing includes a palm-supporting portion and at least one sidewall connected to each other, the first pressable portion and the second pressable portion are located adjacent to the palm-supporting portion of the casing, the first pressable portion, the second pressable portion, and the at least one sidewall are respectively located at different sides of the palm-supporting portion, the at least one haptic generator corresponds to the at least one sidewall and is configured to vibrate the at least one sidewall.

According to the input device as discussed in the above embodiment of the disclosure, one or more haptic generators are arranged at one or more sidewalls of the input device to provide vibration to one or more fingers of a user, thus, in the case that the input device of the disclosure is served as a mouse, the user can receive vibration generated by the haptic generator when moving the mouse cursor to a specific area of the computer screen or clicking the first pressable portion and/or the second pressable portion while the mouse cursor is at a specific area of the screen, and thus making the input device possible to provide haptic feedback in response to the operation of user and thereby enhancing the overall user experience.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," "installed," "provided," and variations thereof are used broadly and encompass both direct and indirect mountings, connections, installations, and fixations. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Figure 1:
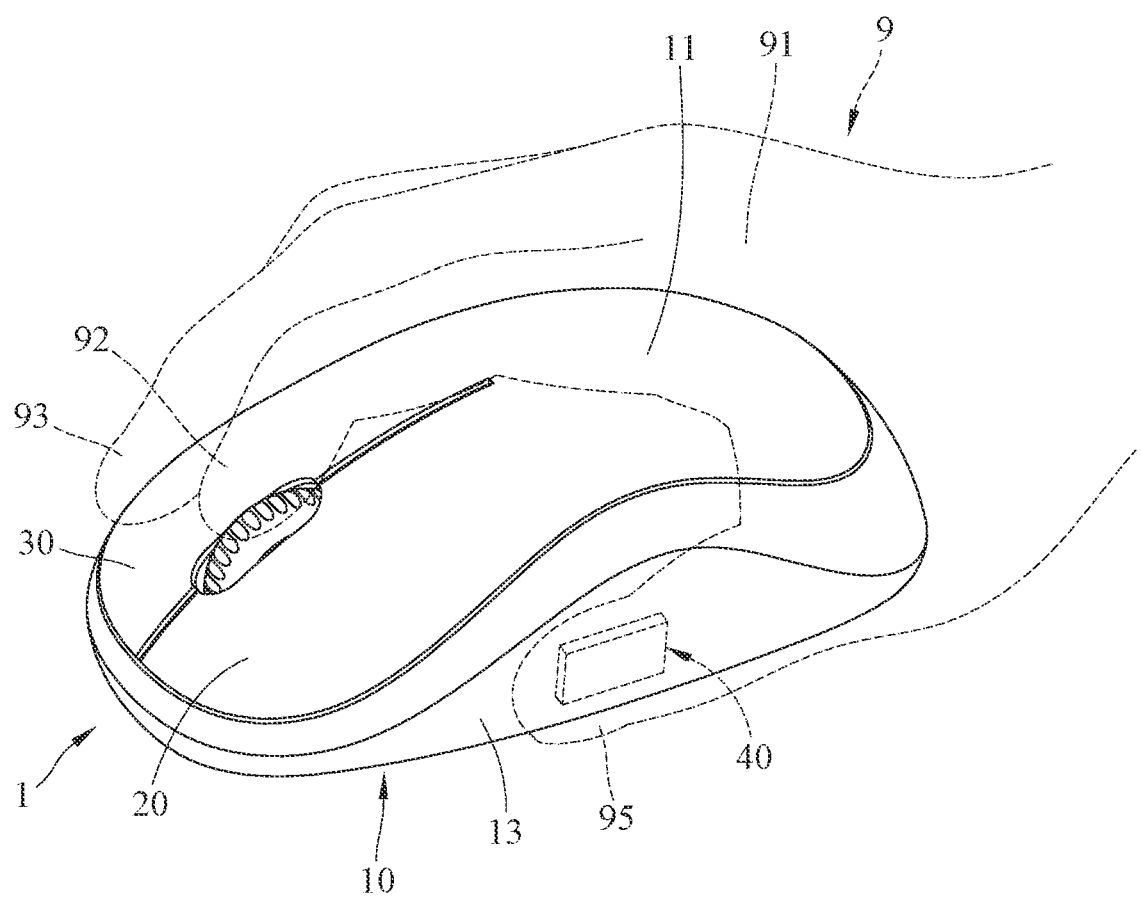
FIG. 1 is a perspective view of an input device according to one embodiment of the disclosure.
Figure 2:
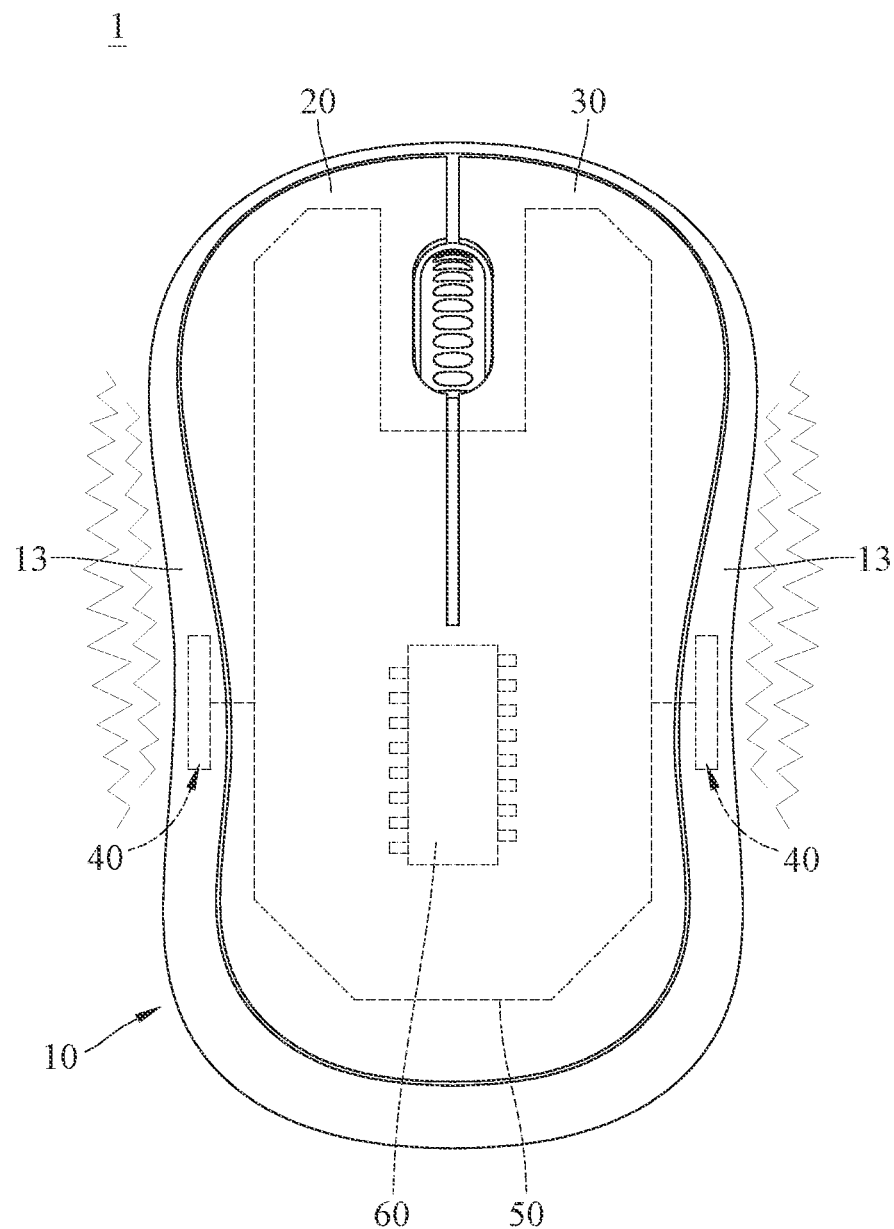
FIG. 2 is a top view of the input device in FIG. 1 which show an internal arrangement thereof.
Figure 3:
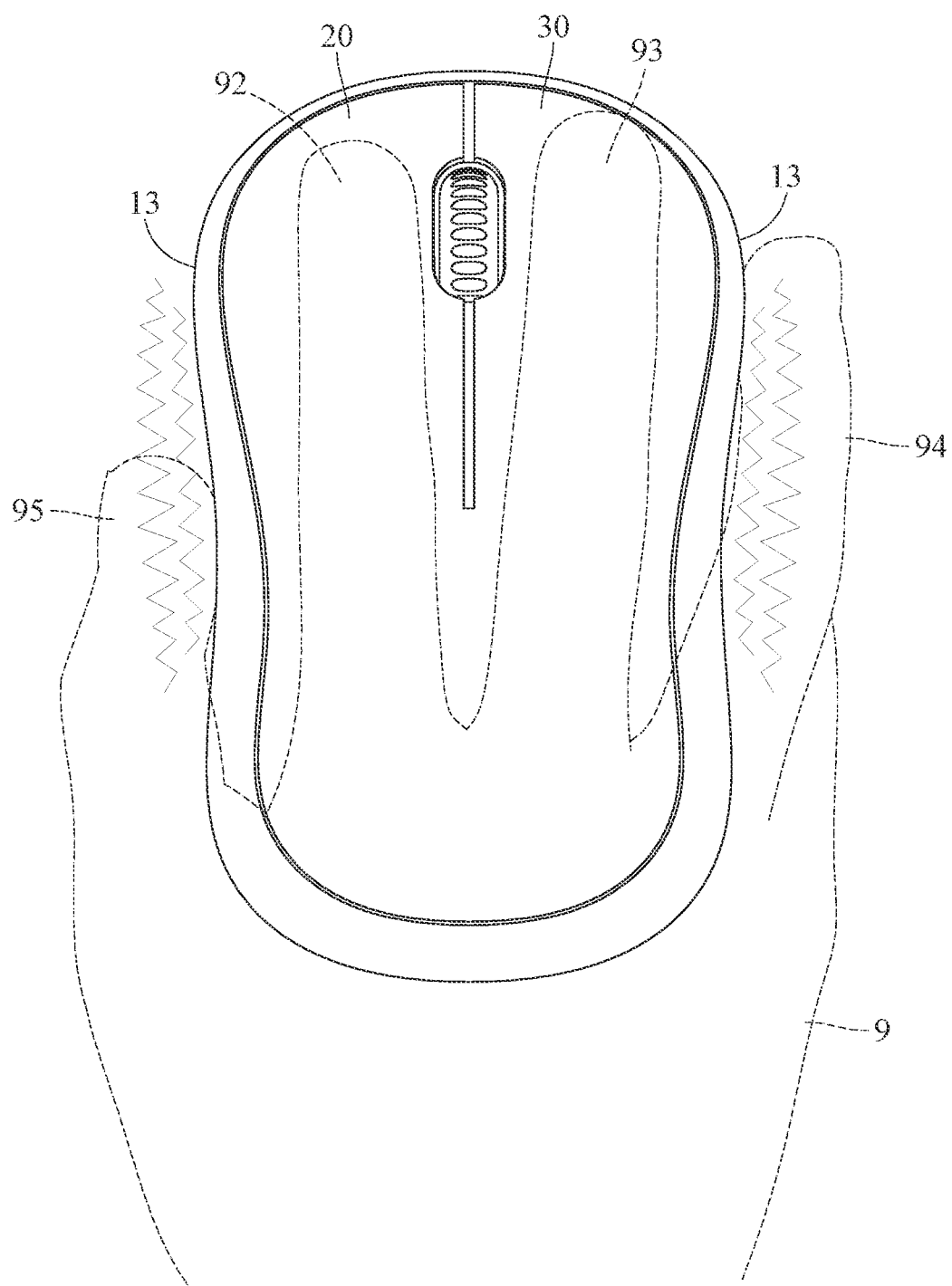
FIG. 3 shows the operation of the input device according to one embodiment of the disclosure.

Please refer to FIGS. 1-3, one embodiment of the disclosure provides an input device 1. The input device 1 may be served as a mouse. The input device 1 may include a casing 10, a first pressable portion (left button) 20, and a second pressable portion (right button)30. The casing 10 may be integrally formed or assembled by a plurality parts made of any suitable material. The casing 10 may have a size and shape suitable for supporting or placement of human's hand (e.g., a hand 9 shown in dashed lines). It is noted that the size, design, and shape of the casing 10 may be modified as required and are not intended to limit the disclosure.

The first pressable portion 20 is disposed on the casing 10. In specific, the first pressable portion 20 may be arranged at the upper portion of the casing 10. In more specific, the first pressable portion 20 may be arranged at the left side or front-left side of the upper portion of the casing 10. The first pressable portion 20 may be served as a button for user to operate the input device 1. In one example, the first pressable portion 20 may be served as the left button of a mouse.

The second pressable portion 30 is disposed on the casing 10. In specific, the second pressable portion 30 may be arranged at the upper portion of the casing 10. In more specific, the second pressable portion 30 may be arranged at the right side or front-right side of the upper portion of the casing 10. The second pressable portion 30 may be served as a button for user to operate the input device 1. In one example, the second pressable portion 30 may be served as the right button of a mouse.

It is noted that the size, design, and shape of the first pressable portion 20 and the second pressable portion 30 may be modified as required and are not intended to limit the disclosure. In another embodiment, the first pressable portion and the second pressable portion may be integrally formed with the casing of the input device so that the upper surface of the casing may be a single smooth surface.

The input device 1 may further include a circuit board 50 and one or more controllers 60, the circuit board 50 is accommodated in the casing 10. Optionally, the circuit board 50 may be electrically connected to switches (not shown) corresponding to the first pressable portion 20 and the second pressable portion 30, and the click of the first pressable portion 20 and/or the second pressable portion 30 may be converted into singles transferring on the circuit board 50. Optionally, the input device 1 may be a wireless or wired input device. In the case that the input device 1 is a wireless input device, the casing 10 may accommodate associated electronic elements (not shown) that can achieve wireless charging; in such a case, the casing 10 may accommodate an inbuilt power source (not shown, e.g., a battery) which is electrically connected to the circuit board 50. In the case that the input device 1 is a wired input device, there is a cable (not shown) electrically connected to the circuit board 50 and extends outward from the casing 10, and such a cable is configured to connect to an external system (e.g., a computer) so as to transfer signals in respond to the clicks of the first pressable portion 20 and/or the second pressable portion 30; in such a case, the input device 1 may receive power via the cable.

The controller 60 may be any suitable processor. The controller 60 may be electrically connected to the circuit board 50 and may be accommodated within the casing 10. The controller 60 is able to process the signals transferring on the circuit board 50.

The input device 1 may further include at least one haptic generator 40. In this embodiment, the casing 10 may include a palm-supporting portion 11 and two sidewalls 13. The palm-supporting portion 11 means the part of the casing 10 which is suitable for supporting or the placement of user's hand 9. The first pressable portion 20 and the second pressable portion 30 are arranged at the same side of the palm-supporting portion 11. The sidewalls 13 are respectively located at different sides of the palm-supporting portion 11. The sidewalls 13 are respectively located at two opposite sides of the casing 10 (in other words, the sidewalls 13 are respectively located at two opposite sides of the palm-supporting portion 11). When in normal use, the palm-supporting portion 11 may be spaced apart from the desk by the sidewalls 13. Then, please see FIG. 1 or FIG. 3, when a palm 91 of a user is placed on the palm-supporting portion 11, an index finger 92 and a middle finger 93 of the user may be respectively located at the first pressable portion 20 and the second pressable portion 30, and a ring finger 94 and a thumb 95 of the user may be naturally located at or in contact with the sidewalls 13, respectively.

In this embodiment, the haptic generators 40 are configured to vibrate the sidewalls 13 of the casing 10 so as to provide haptic feedback to the ring finger 94 and the thumb 95. The haptic generator 40 may be any suitable vibration generating device. The haptic generator 40 may be electrically connected to the circuit board 50 and may be accommodated within the casing 10. The haptic generators 40 may be electrically connected to the controller 60 via the circuit board 50. The haptic generators 40 may be respectively arranged adjacent to the sidewalls 13. In one embodiment, the haptic generators 40 may respectively be in direct contact with the sidewalls 13. The haptic generators 40 are configured to vibrate the sidewalls 13 so as to provide vibration to the ring finger 94 and the thumb 95 when user holds the input device 1. In an exemplary application, when the user operates the input device 1 to move the mouse cursor to a specific area of the computer screen or clicks the first pressable portion 20 and/or the second pressable portion 30 when the mouse cursor is at a specific area of the screen, at least one of the haptic generators 40 will generate vibration to one or two fingers of the user (e.g., the ring finger 94 and the thumb 95). Accordingly, the arrangement of the haptic generators 40 make the input device 1 possible to provide haptic feedback in response to the operation by user.

In one exemplary embodiment, the haptic generators 40 may be located relatively away from the first pressable portion 20 and the second pressable portion 30. This helps make the user receive relatively stronger haptic feedback from non-button area of the input device 1; in other words, this helps the user easier to recognize the haptic feedback from non-button area of the input device 1. Also, since the haptic generators 40 are configured to provide vibration to the area located relatively away from the button areas, the clicks of the first pressable portion 20 and the second pressable portion 30 may be prevented from affecting the user from receiving the vibrations generated by the haptic generator 40.

According to the input device as discussed in the above embodiments of the disclosure, one or more haptic generators are arranged at one or more sidewalls of the input device to provide vibration to one or more fingers of a user, thus, in the case that the input device of the disclosure is served as a mouse, the user can receive vibration generated by the haptic generator when moving the mouse cursor to a specific area of the computer screen or clicking the first pressable portion and/or the second pressable portion while the mouse cursor is at a specific area of the screen, and thus making the input device possible to provide haptic feedback in response to the operation of user and thereby enhancing the overall user experience.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. An input device comprising:
   a casing comprising a palm-supporting portion and two sidewalls connected to two opposite sides of the palm-supporting portion;
   a first pressable portion and a second pressable portion located adjacent to the palm-supporting portion of the casing, wherein the first pressable portion, the second pressable portion, and the two sidewalls are respectively located at different sides of the palm-supporting portion; and two haptic generators respectively connected to the two sidewalls and respectively configured to vibrate the two sidewalls.

2. The input device according to claim 1, further comprising a circuit board accommodated in the casing and electrically connected to the two haptic generators.

3. The input device according to claim 1, further comprising a controller accommodated within the casing and electrically connected to the two haptic generators.

4. The input device according to claim 1, wherein the two haptic generators are in direct contact with the two sidewalls.

5. The input device according to claim 1, wherein the first pressable portion is a button.

6. The input device according to claim 1, wherein the second pressable portion is a button.

7. The input device according to claim 1, wherein the two haptic generators is are located relatively away from the first pressable portion and the second pressable portion.

\* \* \* \* \*